C. A. PRATT.
COMPOSITE LOCOMOTIVE.
APPLICATION FILED DEC. 17, 1906.
900,776.
Patented Oct. 13, 1908.
2 SHEETS—SHEET 2.
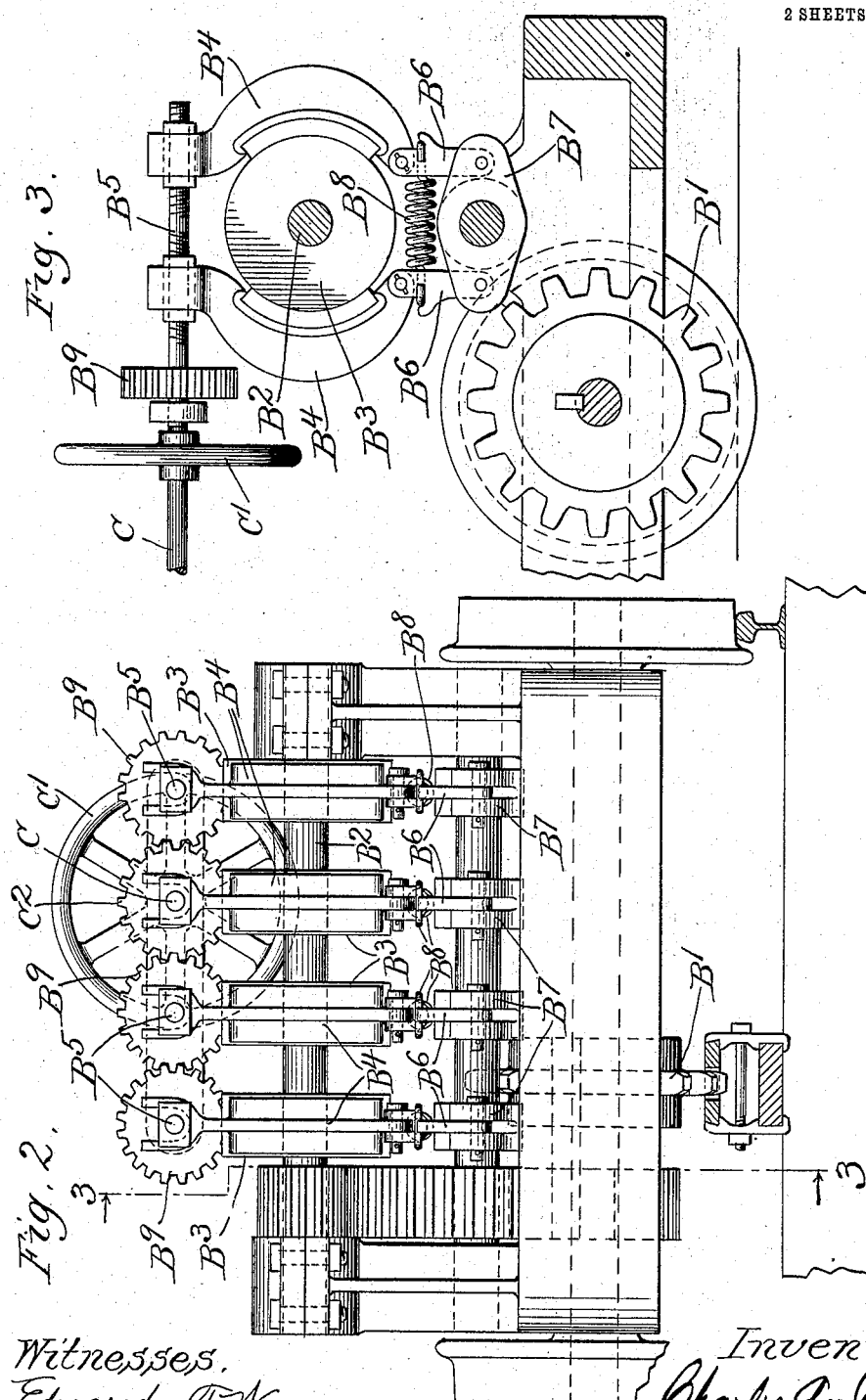
Witnesses.
Edward T. Wray.
Edna K. Reynolds.
Inventor.
Charles A. Pratt
by Parker & Carter
Attorneys.

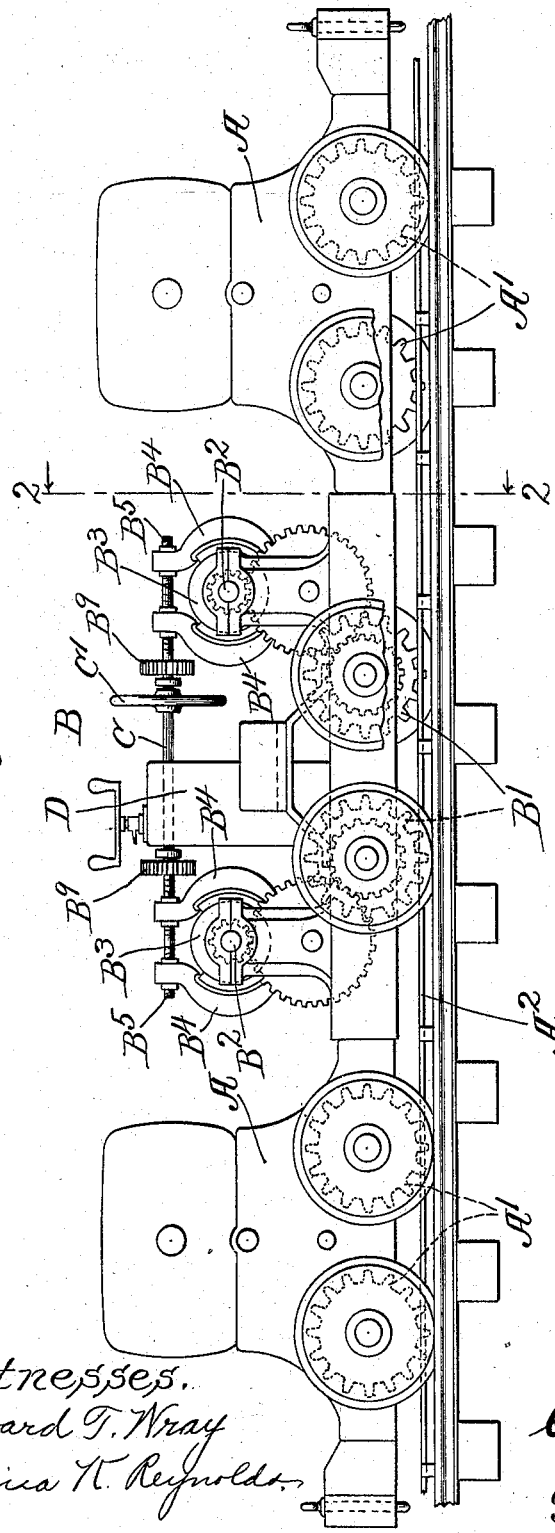

UNITED STATES PATENT OFFICE.

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS.

COMPOSITE LOCOMOTIVE.

No. 900,776.  Specification of Letters Patent.  Patented Oct. 13, 1908.

Application filed December 17, 1906. Serial No. 348,343.

*To all whom it may concern:*

Be it known that I, CHARLES A. PRATT, a citizen of the United States, residing at Chicago, in the county of Cook and State of Illinois, have invented a certain new and useful Improvement in Composite Locomotives, of which the following is a specification.

This invention relates to improvements in composite locomotives, and has for its object to provide a new and improved locomotive of this description.

The invention is illustrated in the accompanying drawings, wherein

Figure 1 is a side view showing a device embodying the invention; Fig. 2 is a sectional view on line 2—2 of Fig. 1; Fig. 3 is a sectional view taken on line 3—3 of Fig. 2.

Like letters refer to like parts throughout the several figures.

The composite locomotive is adapted to be used under various conditions and for various purposes. In handling coal, for example, in coal mines by means of rack rail locomotives, it is customary to connect a locomotive with a series of cars, and, as there are grades and inclines to be passed over, some means must be provided for applying brakes to prevent the too rapid movement of the train, and to provide an efficient and satisfactory means for dissipating the energy which is transformed from potential to kinetic in lowering cars down long inclines or grades. In view of the heavy loads and the conditions which the locomotives must fulfil, it is difficult to get a satisfactory construction.

One of the objects of my invention is to provide such a construction.

As illustrated in Fig. 1, I have shown a composite locomotive consisting of a series of motor units A and a brake unit B, all connected together in any desired manner. The motor units may be constructed in any desired manner, and are provided with some suitable motor, which motor is operatively connected with sprocket wheels $A^1$ provided with teeth which engage the rack $A^2$, the motor and attached load being moved forward by the engagement of these sprocket wheels with the rack. The brake unit B may be formed in any desired manner, and is provided with means apart from the motor units to apply brakes to the apparatus. As herein shown the brake unit is provided with one or more sprocket wheels $B^1$ which engage the toothed rack $A^1$. The sprocket wheels are operatively connected in any desired manner, as by suitable gearing, with the shafts $B^2$. These shafts are provided with braking elements $B^3$, and $B^4$. The elements $B^3$ are preferably brake wheels rigidly connected with the shafts, and elements $B^4$, brake shoes adapted to coöperate with the brake wheels. Some suitable means is provided for operating these brake shoes. As herein shown one set of brake shoes is connected to a shaft C, and the other to shafts $B^5$ by means of right and left-hand threads (see Fig. 3), so that when said shafts are rotated the upper ends of the brake shoes may be moved toward or from each other. The lower ends of these brake shoes are connected to links $B^6$ which are in turn connected to some fixed part $B^7$ of the apparatus. A spring $B^8$ is interposed between the links $B^6$. This spring controls the application of the brakes and prevents too sudden application thereof. The shaft C extends across the brake element as shown in Fig. 1, so as to connect together the brake elements on the two shafts $B^2$, and is provided with a hand-wheel $C^1$. The other shafts $B^5$ are provided with gear wheels $B^9$ which engage the gear wheel $C^2$ on the shaft C so that all of said brake elements may be operated by means of the shaft C and the hand-wheel $C^1$. The brake element B is also preferably provided with the controller D which controls the motor elements A. This controller may be of any desired description, depending upon the motor elements.

The use and operation of the invention are as follows: If for example the train is at the top of a hill, and is starting down, the hand-wheel $C^1$ is turned by the operator so as to rotate the shaft C and the shafts $B^5$. This moves the upper ends of the brake elements $B^4$ toward each other until they clamp the brake-wheels $B^3$ and then against the force of the spring $B^8$ and forces said brake elements against the brake elements $B^3$. This applies pressure to said brake elements, and tends to retard the rotation of the shafts $B^2$ and hence the sprocket wheels $B^1$, because of their connection therewith, and as the train can only move by the rotation of said sprocket wheels because of their connection with the toothed rack, it will thus be seen that any desired brake effect may be secured, even to the total stopping of the train. If, however, the brakes are applied too suddenly, and the train stopped it is liable to be thrown from the track. In order to prevent this, the springs B⁸ are used. This braking apparatus provides a positive brake permitting the train to be under perfect control because the brake point is really at the connection between the sprocket wheels and the rack, and is not dependent upon the weight of the element upon which the brakes are mounted, as is the case when brakes are applied to wheels on a track. This is, of course, of great importance because it is impossible under existing conditions to make the elements containing the brake of sufficient weight to give a proper braking control over the train. With this construction the heat developed by the great weight of the train in going down hill is isolated, as it were, from the motor elements, and can therefore be easily dissipated without in any manner affecting such motor elements. This feature is of great importance, particularly when electric motors are used in connection with the motor elements.

I claim:

1. A composite locomotive comprising a motor unit and a brake unit separate from each other but connected together, a power controller for the motor unit located on the brake unit.

2. A composite locomotive comprising a motor element, a brake element separate therefrom and connected therewith, a sprocket wheel on said brake element, a toothed rack with which said sprocket wheel is operatively connected, and means on the brake element for retarding the rotation of the sprocket wheel to produce a braking effect.

3. A composite locomotive comprising a plurality of motor units each provided with a sprocket wheel operatively connected with a toothed rack, a brake unit associated with said motor units and provided with a sprocket wheel also operatively connected with said rack, and means for retarding the sprocket wheel on the braking element to secure a braking effect.

4. A composite locomotive comprising a motor unit, a brake unit separate therefrom, and connected therewith, a sprocket wheel mounted on said brake unit and operatively connected with a toothed rack located beneath the brake unit, a shaft on the brake unit provided with braking elements adapted to frictionally retard its rotation, and an operative connection between said shaft and said sprocket wheel.

5. A composite locomotive comprising a motor unit and a brake unit distinct from each other but connected together, a positive driving connection between the motor unit and the braking device upon the brake unit, whereby the heating of the brake does not affect the motor unit.

6. A composite locomotive comprising a plurality of motor units, a brake unit distinct from the motor units but connected therewith, and a power controller for the motor units located on the brake unit.

7. A composite locomotive comprising a motor unit and a brake unit distinct from each other but connected together, a sprocket wheel upon each unit, said sprocket wheels adapted to engage a rack.

8. A composite locomotive comprising a motor unit and a brake unit distinct from each other but connected together, the brake unit having a braking capacity exceeding that of the power unit.

CHARLES A. PRATT.

Witnesses:
EDWARD T. WRAY,
DONALD M. CARTER.